Patented Feb. 26, 1946

2,395,419

UNITED STATES PATENT OFFICE 2,395,419

PRESSURE SENSITIVE PRODUCTS

James A. Mitchell, Kenmore, N. Y., assignor to E. I. du Pont de Nemours & Company, Wilmington, Del., a corporation of Delaware No Drawing. Application May 29, 1943, Serial No. 489,057

14 Claims. (Cl. 117—68.5)

This invention relates to the manufacture of pressure-sensitive sheets or tapes. It relates more specifically to the use of a coating on the back side of the sheet or tape to reduce the adhesion of the tacky coating thereto when the product is formed into a roll package or into stacks.

Pressure-sensitive adhesives (i. e., permanently tacky adhesives that can be caused to adhere to smooth surfaces such as smooth regenerated cellulose sheets and the like, by pressure alone at ordinary normal room temperatures) have been applied to various types of supports or base material, for example, sheets and ribbons of paper, cloth, regenerated cellulose film, cellulose acetate film, etc., to form masking tapes, "Scotch tape," and similar products, hereinafter termed "pressure-sensitive" products. The adhesive compositions used have had, in most cases, rubber or rubber derivatives as their main component. The following patents illustrate the various adhesive compositions and adhesive supports used; U. S. Patents Nos. 2,206,899, 2,177,627, 1,895,978, Re. 19,128 and 2,306,487.

When the sheet, ribbon, tape or support coated with the pressure-sensitive adhesive is packaged or stored, it is usually formed either into stacks or rolls. When this is done, the tacky surface comes in contact with the back side of the adhesive support to which it adheres strongly. It is difficult to separate the sheets or to unroll the tape. In some cases, the sheet or tape will tear and frequently part of the adhesive will transfer to the back surface with which it is in contact.

It is, therefore, an object of the present invention to provide a means for reducing the tendency for the pressure-sensitive adhesive to adhere to the back side of the support when the sheets or tapes coated with said adhesive are stacked or formed into rolls.

It is a further object of this invention to provide a coating for the back side of a pressure-sensitive sheet or tape, which coating has reduced adhesion to the pressure-sensitive coating.

Other objects will appear hereinafter.

The above objects are realized by my invention, which briefly stated, comprises providing the back side of pressure-sensitive sheets, tapes and like products with a coating comprising essentially, an aminophosphatide.

The preferred aminophosphatides useful in this invention are the lecithins which are organic derivatives of glycerophosphoric acid wherein the two hydroxyls of the glycerol radical are esterified with higher fatty acids, e. g., oleic, stearic, palmitic, etc., acids, and wherein one of the hydroxyls of the phosphoric acid radical is esterified with the amino alcohol, choline. Lecithins occur naturally in various animal and vegetable tissues and in egg yolk. They may be obtained as described in U. S. Patents Nos. 1,464,557 and 1,895,424 and in "The Soybean Industry" by Horvath (1938). For the purposes of this invention the commercial substances particularly commercial soya-bean lecithin which may contain a small proportion of soya-bean oil and/or other impurities have been found to be quite satisfactory. Other amino-phosphatides which may be used are cephalin, sphingomyelin, etc.

The aminophosphatide may be combined with resins, pigments, cellulose derivatives, starch derivatives, proteins, etc. in the preparation of a coating solution. These added materals produce harder coatings which resist transfer to the tacky adhesives coming in contact with them. In the preferred form of this invention, lecithin is employed and comprises from 25% to 90% by weight of the solids components of the coating composition. Ethyl cellulose has been found to be particularly useful in combination with lecithin.

The aminophosphatide may be applied to the base material in any of the known one-side coating processes. It may be brushed onto the base as a powder or in the form of a paste. It may be sprayed, doctored or brushed onto the base from solution in toluene or other suitable solvents.

The practice of this invention is further illustrated by the following examples wherein parts and percentage compositions are by weight unless otherwise indicated.

Example I

A regenerated cellulose film having a thickness of 0.0012 inch is coated on one side with a thin coating of lecithin from a 10% solution of lecithin in toluene. The coating is dried with air at 100° C. The other side of the film is coated with a composition consisting of:

| | Parts |
|---|---|
| *"Pliolite" (deformation point 30° C.) | 10 |
| Milled rubber | 10 |
| **Piccolyte S-10 (a soft polymerized terpene) | 15 |
| Chlorinated paraffin wax (42% chlorine) | 5 |
| Monobenzyl p-aminophenol | 1 |
| Toluene | 160 |

* "Pliolite" is a thermoplastic rubber derivative made by condensing (isomerizing, cyclizing) rubber with a catalyst of the tin tetrachloride type (see "Paper Trade Journal," page 96, February 23, 1939, J. I. E. C. XIX 1033, XXVI 125, XXXIII 389, and U. S. Patents Nos. 1,797,188, 1,846,247, 1,853,334 and 2,052,391). The chemical structure is described in "Rubber Age", April, 1939.
** Manufactured by Pennsylvania Industrial Chemical Corporation, Clairton, Pennsylvania.

This coating is also dried with air at 100° C. The product obtained is a regenerated cellulose film with a lecithin coating on one side and a tacky, pressure-sensitive adhesive on the other. Stacks or rolls of this product are easily separated into individual sheets or unrolled without transfer of the adhesive and without causing a decrease in the tackiness of said adhesive.

Example II

A regenerated cellulose film having a thickness of 0.0012 inch is coated on one side with the following composition and dried:

| | Parts |
|---|---|
| Soya-bean lecithin | 5 |
| Ethyl cellulose (low viscosity) | 5 |
| Toluene | 190 |

The other side of the film is coated with the following composition and dried:

| | Parts |
|---|---|
| "Pliolite" (deformation point 30° C.) | 10 |
| Milled rubber | 10 |
| Piccolyte S-10 (a soft polymerized terpene) | 15 |
| Chlorinated paraffin wax (42% chlorine) | 5 |
| Monobenzyl p-aminophenol | 1 |
| Toluene | 160 |

The pressure-sensitive adhesive was pressed against the lecithin-coated surface and the bond strength tested in a Suter machine. A 20-gram pull was required to peel the two film surfaces apart. In a control test, the adhesive surface was pressed against uncoated regenerated cellulose film and it was found that 400-grams pull was required to peel the two surfaces apart.

Example III

A regenerated cellulose film having a thickness of 0.0012 inch is coated on one side with the following composition and dried:

| | Parts |
|---|---|
| Soya-bean lecithin | 5 |
| Ethyl cellulose (low viscosity) | 5 |
| Toluene | 190 |

The other side of the film is coated with the following composition and dried:

| | Parts |
|---|---|
| *Beta-naphthol modified rubber (reacted with 17% beta-naphthol) | 4 |
| Chlorinated diphenyl (62% chlorine, plastic semi-solid sp. g. 1.646–1.653) | 4 |
| Chlorinated paraffin wax (35% chlorine) | 1 |
| Toluene | 14 |

* Produced in accordance with Williams U. S. Patent No. 2,158,530.

The coating is dried with air at 100° C. The product obtained is a regenerated cellulose film with a lecithin coating on one side and a tacky, pressure-sensitive adhesive on the other. Stacks or rolls of this product are easily separated into individual sheets or unrolled without transfer of the adhesive and without causing a decrease in the tackiness of said adhesive.

Example IV

A cellulose acetate film having a thickness of 0.0012 inch is coated on one side with a thin coating of lecithin from a 10% solution of lecithin in toluene. The coating is dried with air at 100° C. The other side of the film is coated with a composition consisting of:

| | Parts |
|---|---|
| "Pliolite" (deformation point 30° C.) | 10 |
| Milled rubber | 10 |
| Piccolyte S-10 (a soft polymerized terpene) | 15 |
| Chlorinated paraffin wax (42% chlorine) | 5 |
| Monobenzyl p-aminophenol | 1 |
| Toluene | 160 |

The coating is dried with air at 100° C. The product obtained is a cellulose acetate film with a lecithin coating on one side and a tacky pressure-sensitive adhesive on the other. Stacks or rolls of this product are easily separated into individual sheets or unrolled without transfer of the adhesive and without causing a decrease in the tackiness of said adhesive.

Example V

A polyvinyl alcohol film having a thickness of 0.0012 inch is coated on one side with the following composition and dried:

| | Parts |
|---|---|
| Soya-bean lecithin | 5 |
| Ethyl cellulose (low viscosity) | 5 |
| Toluene | 190 |

The other side of the film is coated with the following composition and dried:

| | Parts |
|---|---|
| "Pliolite" (deformation point 30° C.) | 10 |
| Milled rubber | 10 |
| Piccolyte S-10 (a soft polymerized terpene) | 15 |
| Chlorinated paraffin wax (42% chlorine) | 5 |
| Monobenzyl p-aminophenol | 1 |
| Toluene | 160 |

The product thus obtained is a polyvinyl alcohol film with a lecithin coating on one side and a tacky, pressure-sensitive adhesive on the other. Stacks or rolls of this product are easily separated into individual sheets or unrolled without transfer of the adhesive and without causing a decrease in the tackiness of said adhesive.

The invention is, of course, not limited to the exact materials and conditions set out in the above examples but is susceptible rather to wide variations both in the matter of materials and manipulative detail without departing from the broad principles of the invention.

Thus, in place of the base materials specifically illustrated hereinabove, self-sustaining film or sheets of other materials, such as ethyl cellulose, methyl cellulose and like cellulose derivatives, polyvinyl acetal, acrylonitrile, polyethylene, polyamides, etc., may also be used. If desired, these supports, particularly regenerated cellulose, may be coated with a moisture-proofing composition before application of the aminophosphatide-containing coating.

Likewise, the invention is not limited to its use with only the pressure-sensitive adhesives disclosed in the examples but that it may be used with all such adhesives, e. g., those illustrated in U. S. Patents Nos. 2,206,899, 2,177,627, 1,895,978, Re. 19,128, 2,156,380 and 2,306,487.

The aminophosphatide or aminophosphatide-containing compositions coated on the back of pressure-sensitive tape such as "Scotch tape" make it possible to easily unroll said tapes without harm to the adhesive surface, or, when applied to pressure-sensitive sheets, coatings according to this invention permit individual sheets to be removed from a stack of said sheets without harm to the adhesive surface or without causing the sheets to tear. In those cases where the tape or sheets are coated on both sides with a pressure-sensitive adhesive, interleaves of film coated on both sides with the aminophosphatide composition may be used.

As disclosed in co-pending application, Serial No. 492,122 filed June 24, 1943, the non-stick properties of aminophosphatides may also have other applications; for example, a regenerated cellulose film coated with lecithin may serve as a casting surface for thin cellulose derivative sheets, for example, of nitrocellulose, from which said nitrocellulose sheets may be stripped without tearing or damage. Other applications involve casting a nitrocellulose film onto a regenerated cellulose sheet coated with lecithin, applying an adhesive to the nitrocellulose coating, pressing a fabric onto the adhesive by passing said fabric and adhesive-coated sheets through warm rolls and stripping the regenerated cellulose film from the laminated product, leaving the nitrocellulose bonded to the fabric. A film may, therefore, be laminated to fabrics without penetration of the film-forming materials into the interstices of said fabric. In a similar manner, it is possible to reverse-print with a printing ink on a regenerated cellulose film coated with lecithin and by passing said film along with another sheet or fabric through heated rolls, to transfer the printing to said sheet or fabric.

I claim:

1. A pressure-sensitive nonfibrous sheet, film or tape comprising a base film having on one side a pressure-sensitive adhesive coating and having on the other side a coating which does not adhere strongly to said adhesive coating and which comprises essentially an aminophosphatide.

2. A pressure-sensitive nonfibrous sheet, film or tape comprising a base film having on one side a pressure-sensitive adhesive coating and having on the other side a coating which does not adhere strongly to said adhesive coating and which comprises essentially a lecithin.

3. A pressure-sensitive film, nonfibrous sheet or tape comprising a base film having on one side a pressure-sensitive adhesive coating, and having on the other side a coating which does not adhere strongly to said adhesive coating and which comprises essentially soya-bean lecithin.

4. A pressure-sensitive nonfibrous sheet, film or tape comprising a base film having on one side a pressure-sensitive adhesive coating and having on the other side a coating which does not adhere strongly to said adhesive coating and which comprises essentially a lecithin, said lecithin comprising from 25% to 90% by weight of said last named coating.

5. A pressure-sensitive nonfibrous sheet, film or tape comprising a base film having on one side a pressure-sensitive adhesive coating and having on the other side a coating which does not adhere strongly to said adhesive coating and which comprises essentially a lecithin and ethyl cellulose.

6. A pressure-sensitive film, nonfibrous sheet or tape comprising a base film of regenerated cellulose having on one side a pressure-sensitive adhesive coating and having on the other side a coating which does not adhere strongly to said adhesive coating and which comprises essentially an aminophosphatide.

7. A pressure-sensitive film, nonfibrous sheet or tape comprising a base film of regenerated cellulose having on one side a pressure-sensitive adhesive coating and having on the other side a coating which does not adhere strongly to said adhesive coating and which comprises essentially a lecithin.

8. A pressure-sensitive film, nonfibrous sheet or tape comprising a base film of regenerated cellulose having on one side a pressure-sensitive adhesive coating and having on the other side a coating which does not adhere strongly to said adhesive coating and which comprises essentially soya-bean lecithin.

9. A pressure-sensitive nonfibrous sheet, film or tape comprising a base film of regenerated cellulose having on one side a pressure-sensitive adhesive coating and having on the other side a coating which does not adhere strongly to said adhesive coating and which comprises essentially a lecithin, said lecithin comprising from 25% to 90% by weight of said last named coating.

10. A pressure-sensitive nonfibrous sheet, film or tape comprising a base film of regenerated cellulose having on one side a pressure-sensitive adhesive coating and having on the other side a coating which does not adhere strongly to said adhesive coating and which comprises essentially a lecithin and ethyl cellulose.

11. In the manufacture of pressure-sensitive tapes wherein a base material is coated on one side with a pressure-sensitive adhesive, the improvement which comprises coating the other side of said base material with a composition which does not strongly adhere to said adhesive coating and which comprises essentially an aminophosphatide.

12. A pressure-sensitive nonfibrous sheet, film or tape comprising a base film of regenerated cellulose having on one side a pressure-sensitive adhesive coating and having on the other side a coating consisting of lecithin.

13. A pressure-sensitive nonfibrous sheet, film or tape comprising a base film of regenerated cellulose having on one side a pressure-sensitive adhesive coating and having on the other side a coating consisting of ethyl cellulose and lecithin, said lecithin comprising from 25% to 90% by weight of said last named coating.

14. A pressure-sensitive nonfibrous sheet, film or tape comprising a base film of regenerated cellulose having on one side a pressure-sensitive adhesive coating and having on the other side a coating consisting of about equal amounts of ethyl cellulose and lecithin.

JAMES A. MITCHELL.